(12) United States Patent
Kang (10) Patent No.: US 8,760,997 B2
(45) Date of Patent: Jun. 24, 2014

(54) NETWORK PROTECTION METHOD AND DEVICE

(75) Inventor: Zhihong Kang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 202 days.

(21) Appl. No.: 13/390,214

(22) PCT Filed: Apr. 28, 2010

(86) PCT No.: PCT/CN2010/072284
§ 371 (c)(1),
(2), (4) Date: Feb. 13, 2012

(87) PCT Pub. No.: WO2011/017941
PCT Pub. Date: Feb. 17, 2011

(65) Prior Publication Data
US 2012/0141117 A1 Jun. 7, 2012

(30) Foreign Application Priority Data
Aug. 13, 2009 (CN) .......................... 2009 1 0166131

(51) Int. Cl.
*G01R 31/08* (2006.01)
(52) U.S. Cl.
USPC ......................................... 370/216; 370/224

(58) Field of Classification Search
None
See application file for complete search history.

(56) References Cited

U.S. PATENT DOCUMENTS

| | | | |
|---|---|---|---|
| 6,246,667 B1 * | 6/2001 | Ballintine et al. | 370/224 |
| 6,587,241 B1 * | 7/2003 | Saleh | 398/92 |
| 7,046,619 B2 * | 5/2006 | Alagar et al. | 370/216 |
| 8,248,913 B1 * | 8/2012 | Liu et al. | 370/216 |
| 8,553,534 B2 * | 10/2013 | Allasia et al. | 370/222 |
| 2002/0171886 A1 | 11/2002 | Wu et al. | |
| 2005/0071484 A1 * | 3/2005 | Kang et al. | 709/230 |
| 2012/0141117 A1 * | 6/2012 | Kang | 398/5 |

FOREIGN PATENT DOCUMENTS

| | | |
|---|---|---|
| CN | 1588890 A | 2/2002 |
| CN | 101102521 A | 1/2008 |

* cited by examiner

Primary Examiner — Robert Wilson
(74) Attorney, Agent, or Firm — McGarry Bair PC (57) ABSTRACT

The invention discloses a network protection method and device, the method comprises: initiating a protection configuration request through a control plane of an automatically switched optical network (ASON); and realizing a protection configuration on each node of the network according to the protection configuration request. A safe and reliable recovery capability; a reliable efficiency guarantee and an effective guarantee of the coordination of the switching and recovery are provided.

14 Claims, 5 Drawing Sheets

NETWORK PROTECTION METHOD AND DEVICE

CROSS-REFERENCE TO RELATED APPLICATIONS

This application is a National Phase application of International Application No. PCT/CN2010/072284, filed Apr. 28, 2010, which claims the benefit of Chinese Patent Application No. 200910166131.6, filed Aug. 13, 2009, both of which are incorporated herein by reference in their entirety.

FIELD OF THE INVENTION

The invention relates to the field of communications, and in particular to a network protection method and device.

BACKGROUND OF THE INVENTION

Compared with the traditional protection, a control plane of an automatically switched optical network (ASON) has no significant advantage in service protection recovery capability, protection recovery time and safety and reliability, but has the advantages in network resource utilization rate and service recovery flexibility.

The traditional protection has the significant advantages in recovery time and safety and reliability, but has a low network resource utilization rate. Through planning, the traditional protection adopts the manner of reserving and configuring the resource in a system, and takes the reservation resource in the system as a service protection resource, switches the service loaded on the work path to the reserved protection resource through the manner of fast bridging and switching when the work path has failure, so as to complete the fast recovery capability of the service. The traditional protection has some influences in the fixed occupancy of the network resource, the network traffic and the load balancing, thereby it cannot perform allocation on demand according to the actual network resource.

The ASON control plane (the control plane of ASON) can dynamically and real-timely collect the network resource. According to the occupancy and distribution of the network resource, it can employ load balancing and traffic control strategy to implement routing selection and resource allocation according to call request, and to provide the peer to peer service establishment and the recovery capability through the manner of call control. Although the service switching time and the safety and reliability of the recovery capability provided by the ASON control plane lag behind the traditional protection, the ASON control plane can more flexibly collect and use the network idle resource, and the ASON control plane needs no fixed resource occupancy manner and has a higher resource utilization rate.

SUMMARY OF THE INVENTION

Aiming at the problems that the traditional protection has a low network resource utilization rate, and the intelligent ASON control plane has a poor index of the service switching time and the safety and reliability, the invention provides an improved network protection solution to solve the problems.

To solve the problem above, a network protection method is provided according to one aspect of the invention.

The network protection method according to the invention comprises: a protection configuration request being initiated through the ASON control plane; and a protection configuration being realized on each node according to the protection configuration request.

Further, the step of initiating the protection configuration request through the ASON control plane comprises: a channel-level protection configuration request being initiated through the ASON control plane.

Further, the step of realizing the protection configuration on each node of the network according to the protection configuration request comprises: the corresponding relationship of a working channel and a protection channel being configured on each node of the network according to the protection configuration request.

Further, after realizing the protection configuration on each node of the network according to the protection configuration request, the method also comprises: protection switching being implemented according to the protection configuration when the channel of the network has failure.

Further, the step of initiating the protection configuration request through the ASON control plane comprises: a multiplex section level protection configuration request being initiated through the ASON control plane.

Further, the step of realizing the protection configuration on each node of the network according to the protection configuration request comprises: a two-fibre bidirectional multiplex section protection configuration or a linear multiplex section protection configuration being implemented on each node through which the signalling used by the multiplex section passes according to the protection configuration.

Further, the step of implementing the two-fibre bidirectional multiplex section protection configuration comprises: a related resource of the protection configuration being reserved, the corresponding relationship of the work resource and the protection resource being configured, and a node table of the two-fibre bidirectional multiplex section being configured.

Further, after realizing the protection configuration on each node of the network according to the protection configuration request, the method also comprises: the protection switching being implemented according to the protection configuration when the link section of the network has failures.

Further, the step of realizing the protection configuration on each node of the network according to the protection configuration request comprises: related service channels in the failure nodes being configured with the channel protection in other link sections through which the service paths pass when there are failure nodes, or the head nodes and end nodes of the service being configured with the channel protection.

Further, after realizing the protection configuration on each node of the network according to the protection configuration request, the method also comprises: an alarm status of the working channel and the corresponding protection channel being managed and detected, a hold off timer being started when the working channel has failure and is implemented with the protection switching, the alarm status of the switched protection channel being monitored after the time of the hold off timer arrives, and the ASON control plane being notified to start recovery when the working channel and the protection channel synchronously have alarms.

Further, after realizing the protection configuration on each node of the network according to the protection configuration request, the method also comprises: the hold off timer being started when the working channel has failure and is implemented with protection configuration, and the ASON control plane not starting recovery channel when detecting that the corresponding protection channel has no alarm status after the time of the hold off timer arrives.

Further, after realizing the protection configuration on each node of the network according to the protection configuration request, the method also comprises: the multiplex section protection switching and the hold off timer being started when the link has failure and the link is implemented with the multiplex section protection configuration, and the ASON control plane not starting recovery channel when detecting after the time of the hold off timer arrives that the protection channel corresponding to the working channel in the link which has failure has no alarm status.

Further, after realizing the protection configuration on each node of the network according to the protection configuration request, the method also comprises: in the peer to peer service path, the link having the multiplex section protection configuration, or the working channel through the link having the channel protection configuration; in the nodes with the multiplex section protection or the channel protection configuration, the head nodes and the end nodes of the service being notified to start the hold off timer through the signalling after the working channel has failure, and after the time of the hold off timer arrives, the alarm status of the working channel being detected again, if the working channel still has failure, the ASON control plane being notified to start the recovery operation, and if the working channel has no failure, the ASON control plane being notified not to start the operation.

To realize the purpose, a network protection device is provided according to another aspect of the invention.

The network protection device according to the invention comprises: an initiation module, adapted for initiating the protection configuration request through the ASON control plane; a realization module, adapted for realizing the protection configuration on each node of the network through the protection configuration request initiated by the initiation module.

Further, the device also comprises: a switching module, adapted for implementing protection switching according to the protection configuration realized by the realization module when the link section of the network has failure.

Through the invention, the problems that the traditional protection has a low network resource utilization rate, and the intelligent ASON control plane has a long service switching time and a poor safety and reliability in the related technologies are solved by combining the ASON control plane with the traditional protection. Thus it can provide the safe and reliable recovery capability, reliable efficiency guarantee, and effective guarantee of the coordination of switching and recovery for the service.

BRIEF DESCRIPTION OF THE DRAWINGS

The described drawings are provided for further describing the invention, and forming a part of the application. The schematic embodiments and descriptions of the invention are used for explaining, but not limiting the invention.

DETAILED DESCRIPTION OF THE EMBODIMENTS

In the related technologies, the intelligent ASON control plane realizes the peer to peer service connection and establishment, management and recovery, and provides more flexible service protection capability through the dynamic and real-time network resource management, routing selection and signalling control. The traditional optical transport network (OTN) protection provides the multiplex section level and channel-level protection according to a hierarchical mode, and basically provides a ring and linear combination for the networking requirements, and realizes the safe, reliable and fast service protection capability through the fixed additional resource sharing mode. So the traditional protection has the advantages in the recovery time and safety and reliability, but has a low network resource utilization rate; and the intelligent ASON control plane has the advantages of network resource utilization rate and flexibility of service recovery, but has long service switching time and poor safety and reliability. Based on above problems in the related technologies, the invention provides an improved network protection solution, i.e., a method of combining the ASON control plane with the traditional protection, i.e., a method for mainly combining the ASON control plane technology with the traditional protection technology to realize permanent protection of mesh network (MESH), which can realize flexible, reliable and safe network protection. Meanwhile, under the circumstance of failure nodes, the service protection capability is realized by configuring the channel protection for the related service channels in the failure nodes in other link sections through which the service paths pass, or configuring channel protection for the head node and the end node of the service, and providing a mechanism for guaranteeing the consistency of the traditional protection and the recovery technology of the ASON control plane in the switching and recovery process, thereby realizing the fast service recovery capability under circumstance of channel failure, link failure and node failure.

It needs to be noted that the embodiments in the application and the characteristics in the embodiments can be combined with each other when there is no conflict. The invention is described hereinafter with reference to the drawings and embodiments in detail.

Figure 1:
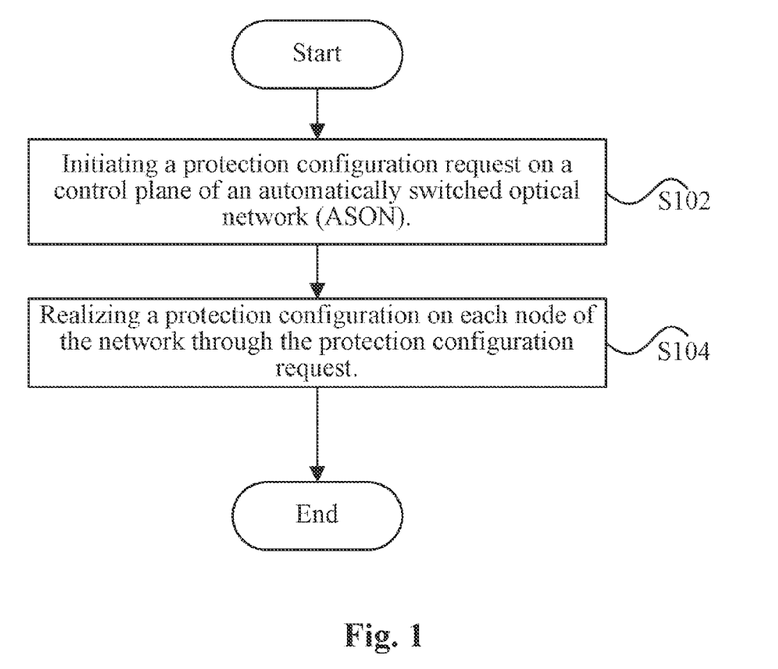
FIG. 1 shows a flowchart of a network protection method according to one embodiment of the invention.

A combination method of the ASON control plane and the traditional protection is provided according to one embodiment of the invention. FIG. 1 shows a flowchart of a network protection method according to one embodiment of the invention, as shown in FIG. 1, the method comprises the following steps of Step S102 to Step S104.

Step S102, the protection configuration request is initiated through the ASON control plane.

Step S104, the protection configuration is realized on each node of the network according to the protection configuration request.

In particular, the solution can comprise the following two situations.

Situation 1: the channel-level protection configuration request is initiated through the ASON control plane, and then the corresponding relationship of the working channel and the protection channel is configured on each node of the network according to the protection configuration request; thus, the protection switching can be implemented according to the protection configuration when the channels of the network have failures.

Situation 2: the multiplex section (also called as the link section, which cannot influence the nature of the invention) level protection configuration request is initiated through the ASON control plane; and then the two-fibre bidirectional multiplex section protection or linear multiplex section protection configuration can be implemented on each node through which the signalling used by the multiplex section passes according to the protection configuration request. The following is the description of the case of the two-fibre bidirectional multiplex section protection configuration, which comprises that: the related resource of the protection configuration is reserved, the corresponding relationship of the work resource and the protection resource is configured, the node table of the two-fibre bidirectional multiplex section is configured. Thus the protection switching can be implemented according to the protection configuration when the link section of the network has failure.

Through the embodiment, the method provides a traditional 1+1 protection configuration capability, i.e., subnetwork connection protection (SNCP) of the service, for the channels based on the ASON control plane technology and through the call control mode. The service is provided with the safe and reliable recovery capability and the reliable efficiency guarantee by starting the protection switching through the traditional channel protection configuration configured by the ASON control plane when the channel has failures. The method provides the traditional multiplex section protection configuration for the link section, and synchronously applies the traditional protection protocol to start the protection switching of multiplex section through the traditional configuration configured by the ASON when the link section has failure. It can provide safe and reliable recovery capability and the reliable efficiency guarantee for the service.

Meanwhile, when the channel and the link have failure, in order to prevent the protection switching and the ASON control plane recovery from being synchronously started, a "service channel detection unit" needs to be added, for managing and detecting the alarm status of the working channel and the corresponding protection channel. Under the condition that the working channel has failure and is implemented with the protection switching, by adopting the hold off time, e.g., setting a hold off timer, the alarm status of the switched protection channel is detected after the time of the hold off timer arrives. Under the condition that the working channel and the protection channel synchronously have alarms, the service channel detection unit notifies the ASON control plane to start the recovery. Thus, the coordination communication of the traditional protection and the ASON recovery technology can be effectively guaranteed.

When the channel has failure and is implemented with the channel protection configuration, the channel protection switching is started. The service channel detection unit first detects that the working channel has failure, and finds that the working channel has the channel protection configuration, then starts the hold off timer, and detects that the corresponding protection channel has no alarm status after the hold off time, and then does not start the recovery operation for the ASON control plane.

The multiplex section protection switching is started when the link has failure and is implemented with the multiplex section protection configuration. The service protection channel detection unit first detects that the working channel has failure, and finds that the link which is corresponding to the working channel has the multiplex section protection configuration, then starts the hold off timer, and detects that the protection channel corresponding to the working channel in the link which has failure has no alarm status after the hold off time, and does not start the recovery operation for the ASON control plane.

Meanwhile, in the peer to peer service path, a certain link has the multiplex section protection configuration, or the working channel which passes through a certain link has the channel protection configuration. In the nodes with the multiplex section protection or channel protection configuration, the "service channel detection unit" in the nodes will notify the "service channel detection unit" on the head node and end node of the service through the signalling to start the hold off time after the working channel has failure, and to detect the alarm status of the working channel again after the hold off time. The ASON control plane is notified to start the recovery operation if the working channel still has failure after the hold off time. And the ASON control plane needs not to start any operation if the working channel has no failure after the hold off time.

Through the above description, under the configuration of having performed the channel protection and the multiplex section protection by the ASON control plane or the network management, the traditional protection and the recovery technology of the ASON control plane need to be coordinated under the condition that the channels, links and nodes have failures, so as to guarantee the consistence of the switching and recovery.

The implementation process of the embodiments of the invention is described hereinafter in detail with reference to examples. The 1+1 protection configuration of the channels and the multiplex section protection configuration of the link sections are respectively implemented, in the manner of call control, through performing the collection and calculation function on the network resources for the channel and link sections according to the ASON control plane technology. When the channels and the links have failure, the fast protection switching and the coordination of the protection switching and recovery can be started.

Figure 2:
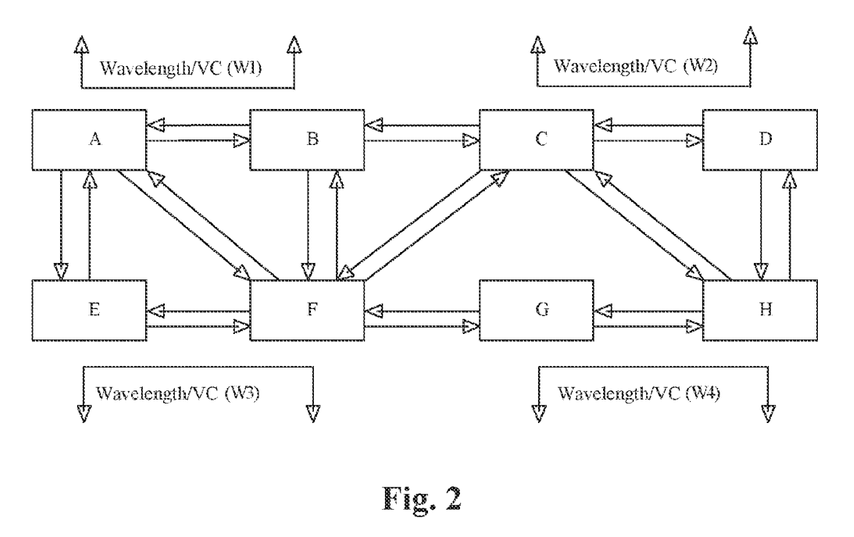
FIG. 2 shows a diagram of the configuration mode of a normal working channel according to one embodiment of the invention.

FIG. 2 shows a diagram of the configuration mode of a normal working channel according to one embodiment of the invention. As shown in FIG. 2, one or more channel services between a node A and a node B is represented as W1, one or more channel services between a node C and a node D is represented as W2, one or more channel services between a node E and a node F is represented as W3, and one or more channel services between a node G and a node H is represented as W4.

Figure 3:
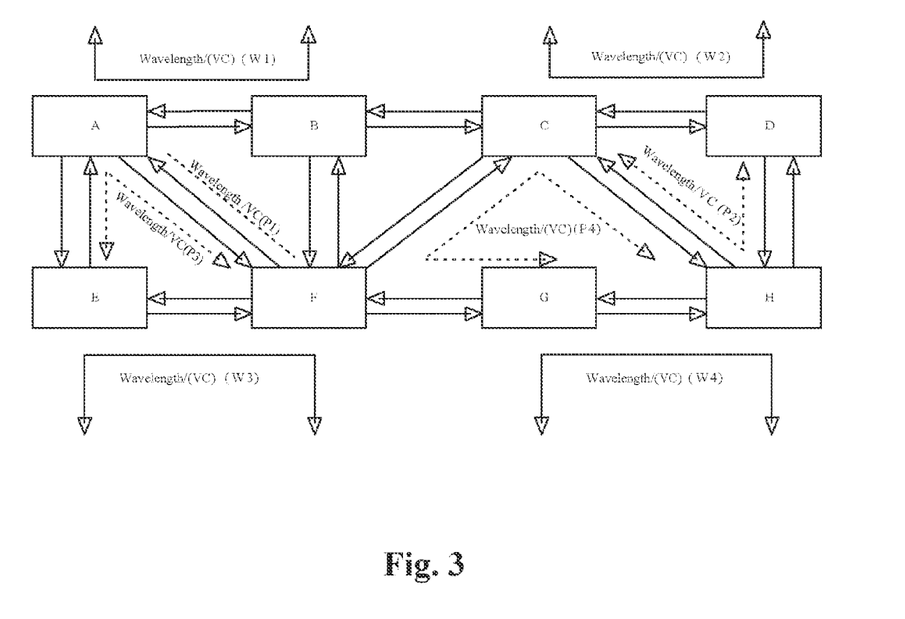
FIG. 3 shows a diagram of a configuration mode for searching the corresponding protection channel aiming at each working channel according to one embodiment of the invention.

FIG. 3 shows a diagram of a configuration mode for searching the corresponding protection channel aiming at each working channel according to one embodiment of the invention. As shown in FIG. 3, the protection channel resource controlled in the network is searched for the channel W1 between the node A and node B through the ASON control plane. The path of a searched idle channel is A<→F<→B. The channel idle resource corresponding to each path is identified as P1 consistently. The ASON control plane initiates the establishment of the protection channel aiming at the W1 working channel between the node A and the node B. The protection configurations of W1 and P1 channels are configured on the node A, and the punch-through operation of the protection channel is configured on the node F. The protection configurations of the W1 and P1 channels are configured on the node B. The fast switching can be started through the traditional protection channel configuration configured by the ASON when the channel W1 has failure. The channel protection configurations of the W2, W3 and W4 are completed through the ASON routing selection and the call control mode, and are consistent with the operation of the W1.

Figure 4:
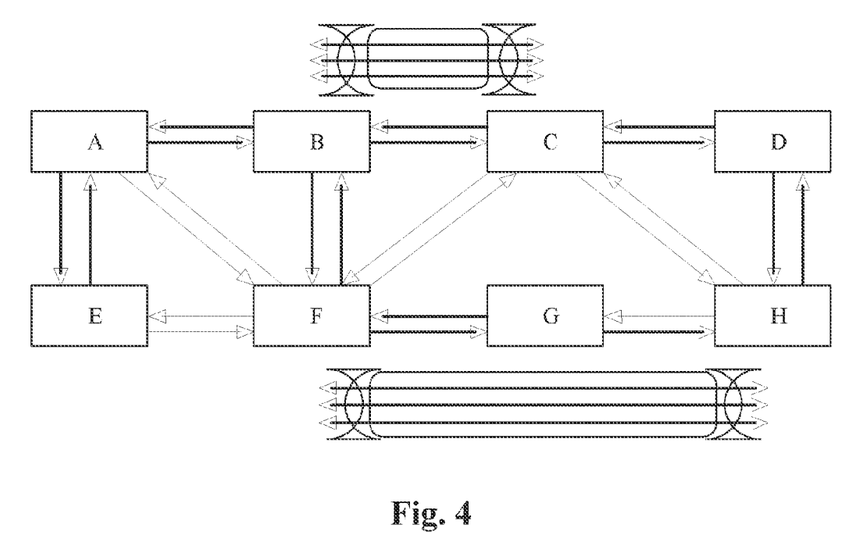
FIG. 4 shows a diagram of a definition of the link section according to one embodiment of the invention.

FIG. 4 shows a diagram of a definition of the link section according to one embodiment of the invention. As shown in FIG. 4, the link section is a physical link connected between the adjacent physical nodes, physical links between adjacent nodes, or a logical link section formed by physical links connected continuously by multiple sections among multiple nodes. An intermediate node in the multiple nodes is an optical line amplifier (OLA) node or a full-through node. The physical links among the node F, node G and node H in the following figure can form a logical link section, and two ends of the link section are respectively the node F and the node H.

As shown in FIG. 4, if a system backbone node is located between the node B and the node C, as a hub node for service scheduling in the network, and it bears a large amount of services in the network, then the link sections between the node B and node C can be implemented with unified protection, and the following steps of Step S402 to Step S406 are included.

Step S402: the multiplex section protection configuration request of the B<→C link section is initiated through the ASON control plane. Supposing that Channel 1, Channel 2, Channel 3, Channel 4 and Channel 5 between B and C bear a large amount of services, the control plane, according to the resource status on the node B and the node C, searches other passed path(s) having equivalent idle resource. Supposing that the path formed by the four links among B, A, F and C in above figure has equivalent idle resources, Channel 6, Channel 7, Channel 8, Channel 9 and Channel 10 on the link between B and A are idle, Channel 6, Channel 7, Channel 8, Channel 9 and Channel 10 on the link between A and F are idle, and Channel 6, Channel 7, Channel 8, Channel 9 and Channel 10 on the link between F and C are idle. The Channels represent the high-order path on a time division multiplexing (TDM), that is, a synchronous digital hierarchy/synchronous optical network (SDH/SONET) device, or represent a wavelength (Lambda) channel on a wavelength division multiplexing (WDM) device. The idle channels between each link can be inconsistent, but there must have the capability of scheduling and changing the lambda channel for the WDM device.

Figure 5:
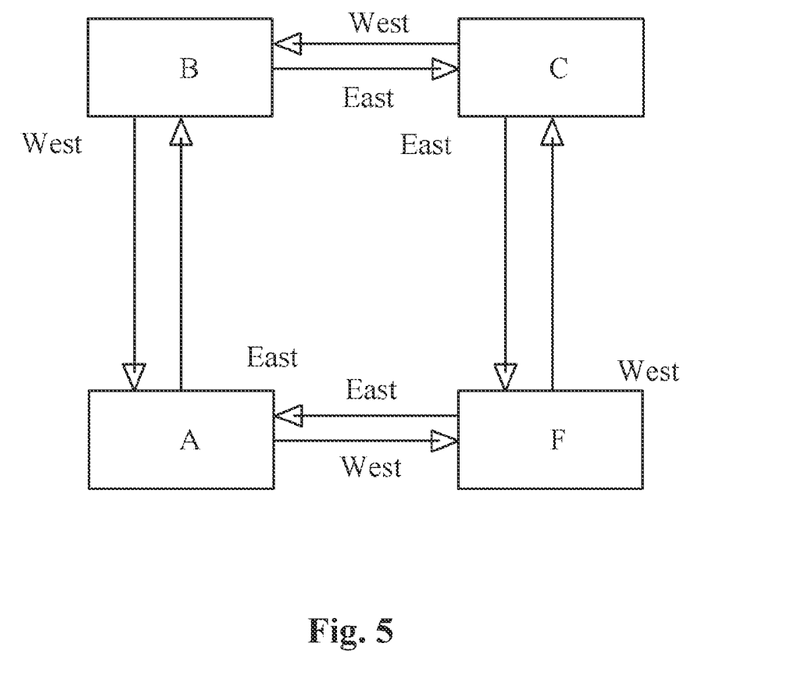
FIG. 5 shows a diagram of forming a multiplex section ring for the protected link section through an ASON control according to one embodiment of the invention.

FIG. 5 shows a diagram of forming a multiplex section ring for the protected link section through the ASON control according to one embodiment of the invention. As shown in FIG. 5, the nodes C, B, A and F are stripped from the network to form a ring network consisting four nodes.

Step S404: the call request is initiated through the control plane; the two-fibre bidirectional multiplex section protection configuration is configured on each of the nodes B, A, F and C through which the signalling passes; the related resources are reserved; the corresponding relationship between the work resource and the protection resource is configured; and the node table of the two-fibre bidirectional multiplex section is configured;

through call control, the multiplex section protection configuration of the signalling on node B is that:
an east link is the link between B→C;
a west link is the link between B→A;
node table={B, C, F, A}; and
the corresponding relationship between the working channel and the protection channel is shown as Table 1:

TABLE 1

| Work Channel | Protection Channel |
| --- | --- |
| Channel 1 | Channel 6 |
| Channel 2 | Channel 7 |
| Channel 3 | Channel 8 |
| Channel 4 | Channel 9 |
| Channel 5 | Channel 10 |

Node A only can be used as an intermediate punch-through status of the multiplex section protection configuration, and the multiplex section protection configuration of the signalling trigger on node A is that:
the east link is the link between A→B;
the west link is the link between A→F;
node table={A, B, C, F}; and
the punch-through channel between the east link and the west link when punching through is shown as Table 2:

TABLE 2

| East | West |
| --- | --- |
| Channel 6 | Channel 6 |
| Channel 7 | Channel 7 |
| Channel 8 | Channel 8 |
| Channel 9 | Channel 9 |
| Channel 10 | Channel 10 |

Node F only can be used as an intermediate punch-through status of the multiplex section protection configuration, and the multiplex section protection configuration of the signalling trigger on node F is that:
the east link is the link between F→A;
the west link is the link between F→C;
node table={F, A, B, C}; and
the punch-through channel between the east link and the west link when punching through is shown as Table 3:

TABLE 3

| East | West |
| --- | --- |
| Channel 6 | Channel 6 |
| Channel 7 | Channel 7 |
| Channel 8 | Channel 8 |
| Channel 9 | Channel 9 |
| Channel 10 | Channel 10 |

Through call control, the multiplex section protection configuration of the signalling on node C is that:
the east link is the link between C→F;
the west link is the link between C→B;
node table={C, F, A, B}; and
the corresponding relationship between the working channel and the protection channel is shown in Table 4:

TABLE 4

| Work Channel | Protection Channel |
| --- | --- |
| Channel 1 | Channel 6 |
| Channel 2 | Channel 7 |
| Channel 3 | Channel 8 |
| Channel 4 | Channel 9 |
| Channel 5 | Channel 10 |

Step S406: the configuration of the multiplex section ring can only trigger the overall switching of the multiplex section ring when the link sections to be protected have fibre breaking or signal cracking, and the alarms occurred in other link sections cannot trigger the actions and protocol operations of the multiplex section ring.

For the situation of multiple sections of links forming a logical link section, one logical link section can be taken as a physical link section to implement the operation.

Figure 6:
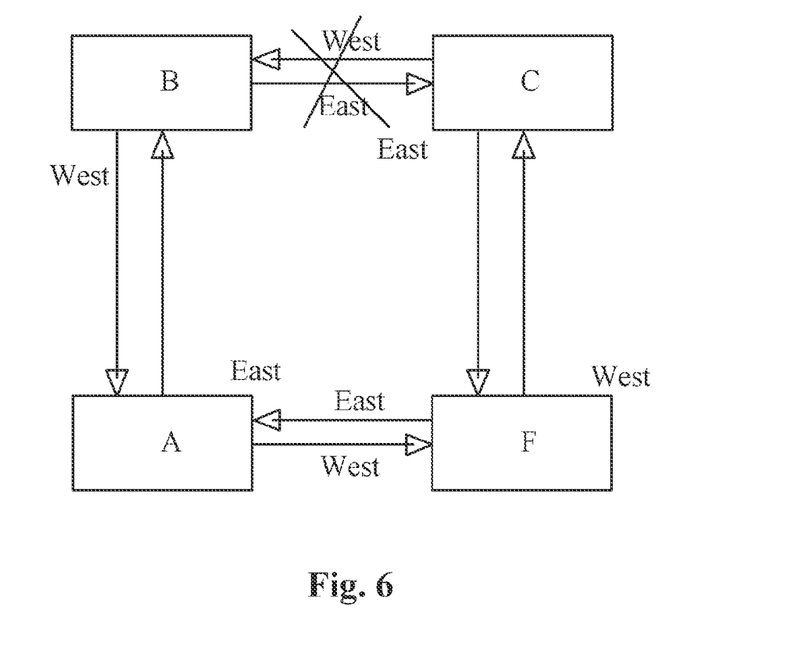
FIG. 6 shows a diagram of switching protection path indication after the link section has failure according to one embodiment of the invention.

FIG. 6 shows a diagram of switching protection path indication after the link section has failure according to one embodiment of the invention. As shown in FIG. 6, the multiplex section level protection can be fast, reliably and effectively completed through the protection configuration initiated by the previous control plane after the fibre of the links between B and C breaks, completely avoiding the recovery mode that the control plane controls each channel one by one and providing the overall recovery capability and efficiency of the service.

Figure 7:
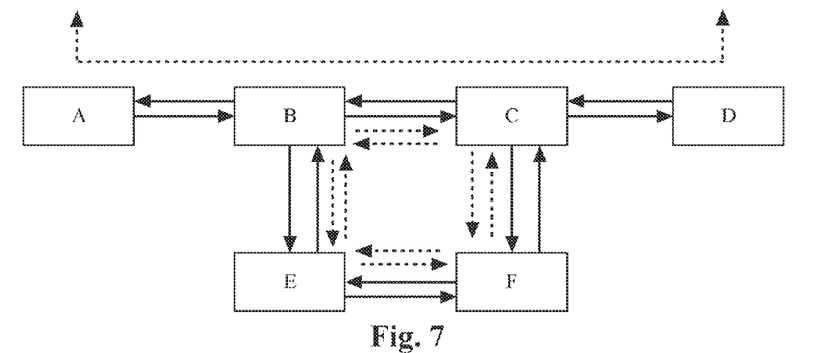
FIG. 7 shows a first diagram of a multiplex section ring formed by the link section according to one embodiment of the invention.

FIG. 7 shows a first diagram of the multiplex section ring formed by the link section according to one embodiment of the invention. As shown in FIG. 7, there is a channel service between node A and node D, and the path nodes passed are A, B, C, and D respectively. The working channel is configured with the channel protection configuration on the passed nodes B and C. The nodes B and C notifies the service channel detection unit of the head node A and the end node in the manner of signalling to start the alarm monitoring status of the working channel later. Nodes B and C start the channel protection switching first after the working channels of nodes B and C have failure. Nodes A and D will monitor the alarm status of the working channel. Since previously receiving from nodes B and C on which the service path passes the notification of starting the alarm monitoring operation of the working channel later, nodes A and D start the Holdoff timer. And after the timer has timeout, as nodes B and C are implemented with the service switching and the overall service is bridged, nodes A and D detect no alarm status, and do not start the recovery operation.

Figure 8:
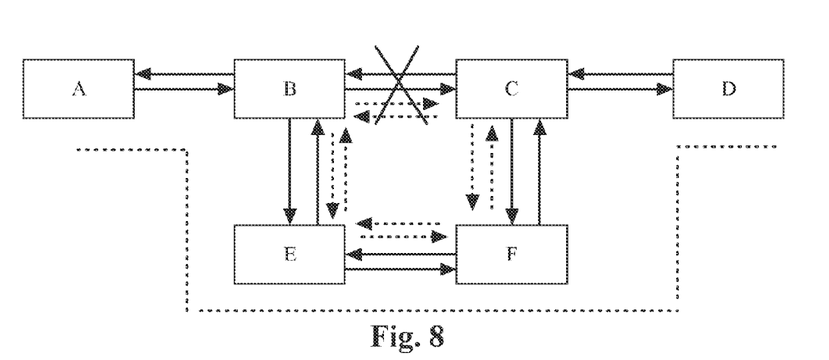
FIG. 8 shows a second diagram of the multiplex section ring formed by the link section according to one embodiment of the invention.

FIG. 8 shows a second diagram of the multiplex section ring formed by the link section according to one embodiment of the invention. FIG. 8 shows a path diagram of the overall service of the nodes A and D after the working channels of the nodes B and C have failures, and after the nodes B and C start the channel protection switching.

Figure 9:
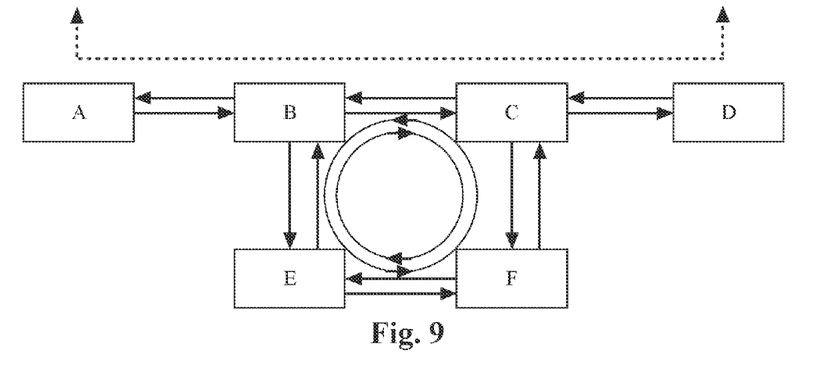
FIG. 9 shows a third diagram of the multiplex section ring formed by the link section according to one embodiment of the invention.

Similarly, FIG. 9 shows a third diagram of the multiplex section ring formed by the link section according to one embodiment of the invention. As shown in FIG. 9, a channel service is between nodes A and D, and the passed path nodes are A, B, C, and D respectively. The multiplex section protection is configured on the passed B and C link sections, and the four nodes of the multiplex section ring are B, C, F, and E respectively. Nodes B and C notify the service channel detection unit of the head node A and end node D of the service in the manner of signalling to later start the alarm monitoring status of the working channel. After nodes B and C have failures, nodes B and C first start the multiplex section protection switching. Nodes A and D will monitor the alarm status of the working channel. Since previously receiving the notification from nodes B and C on which the service path passes of starting the alarming monitoring operation of the working channel later, nodes A and D start the Holdoff timer. After the timer has timeout, as nodes B and C are implemented with the service switching and the overall service is bridged, nodes A and D detect no alarm status, and do not start the recovery operation.

Figure 10:
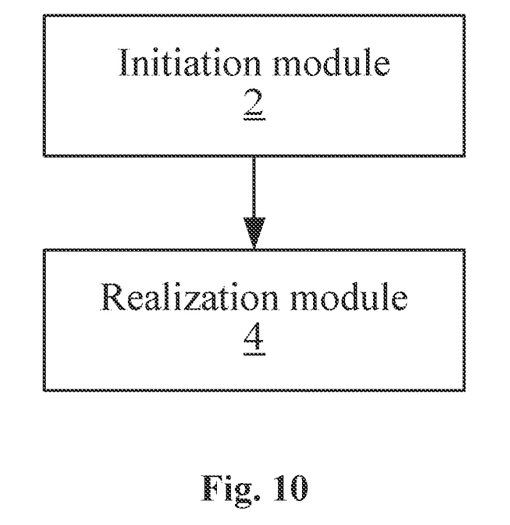
FIG. 10 shows a structural diagram of a network protection device according to one embodiment of the invention.

A network protection device is provided according to one embodiment of the invention. FIG. 10 shows a structural diagram of a network protection device according to one embodiment of the invention. As shown in FIG. 10, the device comprises: an initiation module 2 and a realization module 4. The above structure is described hereinafter.

The initiation module 2 initiates the protection configuration request through the ASON control plane; and the realization module 4 is connected to the initiation module 2, adapted for realizing the protection configuration on each node of the network according to the protection configuration request initiated by the initiation module 2.

Figure 11:
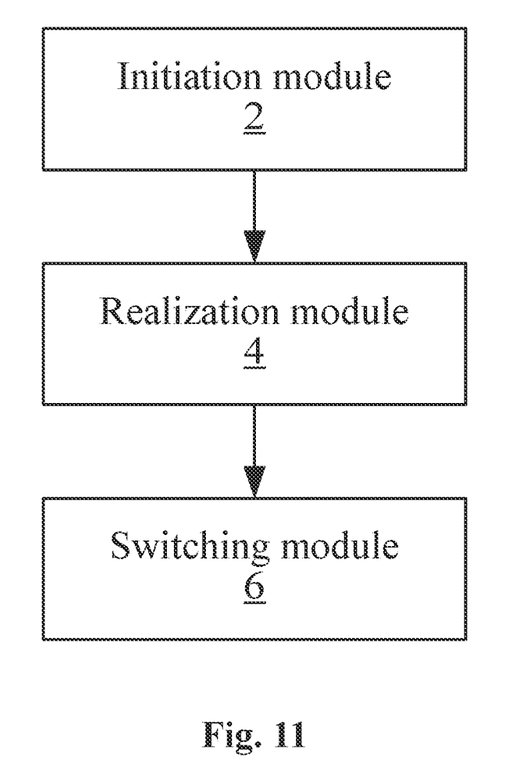
FIG. 11 shows a structural diagram of the network protection device according to a preferable embodiment of the invention.

FIG. 11 shows a structural diagram of the network protection device according to a preferable embodiment of the invention. As shown in FIG. 11, the device also comprises: a switching module 6 which is connected to the realization module 4, adapted for implementing the protection switching according to the protection configuration realized by the realization module when the link section of the network has failure.

In particular, the solution can comprise the following two situations:

Situation 1: the initiation module 2 initiates the channel-level protection configuration request through the ASON control plane; the realization module 4 configures the corresponding relationship between the working channel and the protection channel on each node in the network according to the protection configuration request; thus, the switching module 6 can implement the protection switching according to the protection configuration when the channels of the network have failure.

Situation 2: the initiation module 2 initiates the multiplex section level protection configuration request through the ASON control plane; and then the realization module 4 implements the two-fibre bidirectional multiplex section protection configuration on each node on which the signalling used by the multiplex section passes according to the protection configuration request, wherein comprising: the related resource of the protection configuration is reserved, the corresponding relationship between the work resource and the protection resource is configured, and the node table of the two-fibre bidirectional multiplex section is configured. Thus, the switching module 6 can implement the protection switching according to the protection configuration when the channels of the network have failure.

In summary, the embodiment of the invention provides a solution which combines the ASON control plane technology and is on the basis of the fast switching and safe and reliable capability of the traditional protection. The solution realizes the network recovery capability with safety and reliability, fast recovery and high resource utilization rate through the combination of the ASON control plane and the traditional protection. And in particular, it can integrate the idle resources in the network as the protection resource of the important service in the network according to the routing selection and resource distribution strategy, and configure the peer to peer traditional protection group (including Channel 1+1 and channel 1:N under the channel-level, and the multiplex section shared protection and the linear multiplex section 1:N under the link level) through call control mode. Thus, when the network (service working path) has failure, fast recovery switching can be started, and the safe and reliable recover capability and the reliable efficiency guarantee of the service can be provided.

Obviously, those skilled in the art should know that each module or step of the invention can be realized by the general computing devices. All the modules and steps can be gathered on a single computing device, or distributed on the network consisting of multiple computing devices. Selectively, they can be realized by the program codes which can be executed by the computing devices. Thereby, all the modules and steps can be stored in the storage device and then executed by the computing device, or can be respectively made as each integrated circuit module, or multiple modules or steps thereof can be made as a single integrated circuit module. Thus, the invention cannot be limited by any special combination of the hardware and software.

The above are only the preferred embodiments of the invention and are not intended to limit the invention. For those skilled in the art, any modifications, equivalent replacements, improvements and the like within the spirit and principle of the invention shall fall within the scope of protection of the invention.

What is claimed is:

1. A network protection method, comprising:
    sending a protection configuration request through a control plane of an automatically switched optical network (ASON); and
    configuring each node on the ASON network with a protection configuration according to the protection configuration request;
    wherein after configuring each node on the ASON network with the protection configuration according to the protection configuration request, the method further comprises:
    managing and detecting an alarm status of a working channel and the corresponding protection channel, starting a hold off timer when the working channel has failure and is implemented with protection switching, monitoring the alarm status of the switched protection channel after the time of the hold off timer arrives, and notifying the control plane of ASON to start recovery when the working channel and the protection channel synchronously have alarms.

2. The method according to claim 1, wherein the step of sending the protection configuration request through the control plane of ASON comprises:
    sending a channel-level protection configuration request through the control plane of ASON.

3. The method according to claim 2, wherein the step of configuring each node on the ASON network with the protection configuration according to the protection configuration request comprises:
    configuring the corresponding relationship of a working channel and a protection channel on each node of the ASON network according to the protection configuration request.

4. The method according to claim 3, wherein after configuring each node on the ASON network with the protection configuration according to the protection configuration request, the method also comprises:
    performing protection switching according to the protection configuration when the channel of the ASON network has failure.

5. The method according to claim 1, wherein the step of sending the protection configuration request through the control plane of ASON comprises:
    sending a multiplex section level protection configuration request through the control plane of ASON.

6. The method according to claim 5, wherein the step of configuring each node on the ASON network with the protection configuration according to the protection configuration request comprises:
    configuring on each node through which a signalling used by the protection configuration request on a multiplex section passes a two-fibre bidirectional multiplex section protection configuration or a linear multiplex section protection configuration.

7. The method according to claim 6, wherein the step of configuring the two-fibre bidirectional multiplex section protection configuration comprises:
    reserving related resources of the protection configuration, configuring the corresponding relationship of a work resource and a protection resource, and configuring a node table of the two-fibre bidirectional multiplex section.

8. The method according to claim 6, wherein after configuring each node on the ASON network with the protection configuration according to the protection configuration request, the method also comprises:
    performing protection switching according to the protection configuration when link sections of the ASON network have failures.

9. The method according to claim 1, wherein the step of configuring each node on the ASON network with the protection configuration according to the protection configuration request comprises:
    when a failure node exists, configuring channel protection for the related service channels in the failure node in other link sections through which the service paths pass, or configuring the channel protection on the head node and end node of the service.

10. The method according to claim 1, wherein after configuring each node on the ASON network with the protection configuration according to the protection configuration request, the method also comprises:
    starting a hold off timer when a working channel has failure and is implemented with the protection configuration, and not starting the recovery operation for the control plane of ASON when detecting that the corresponding protection channel has no alarm status after the time of the hold off timer arrives.

11. The method according to claim 1, wherein after configuring each node on the ASON network with the protection configuration according to the protection configuration request, the method also comprises:
    starting the multiplex section protection switching when a link has failure and the link is implemented with the multiplex section protection configuration, starting a hold off timer, detecting after the time of the hold off timer arrives that a protection channel corresponding to a working channel in the link which has failure has no alarm status, and not starting the recovery operation for the control plane of ASON.

12. The method according to claim 1, wherein after configuring each node on the ASON network with the protection configuration according to the protection configuration request, the method also comprises:
    in the peer to peer service path, a link having the multiplex section protection configuration, or a working channel which passes through the link having the channel protection configuration; in the nodes with the multiplex section protection or the channel protection configuration, a service head node and a service end node being notified to start a hold off timer through the signalling after the working channel has failures; and detecting the alarm status of the working channel again after the time of the hold off timer arrives, if the working channel still has failure, notifying the control plane of ASON to start the recovery operation, and if the working channel has no failure, notifying the control plane of ASON not to start the operation.

13. A network protection device, comprising:
a memory storing a initiation module and a realization module,
a processor upon executing the initiation module performs the following: sending a protection configuration request through a control plane of an automatically switched optical network (ASON) wherein said processor upon executing the realization module performs the following: configuring each node on the ASON network with the protection configuration through the protection configuration request sent by the initiation module, managing and detecting an alarm status of a working channel and the corresponding protection channel, wherein starting a hold off timer when the working channel has failure and is implemented with protection switching, monitoring the alarm status of the switched protection channel after the time of the hold off timer arrives, and notifying the control plane of ASON to start recovery when the working channel and the protection channel synchronously have alarms.

14. The device according to the claim 13, wherein the memory also stores a switching module wherein the processor executes the switching module performs the following:
performing protection switching according to the protection configuration configured by the realization module when the link section of the ASON network has failure.

* * * * *